US008838691B2

(12) United States Patent
Liu et al.

(10) Patent No.: US 8,838,691 B2
(45) Date of Patent: Sep. 16, 2014

(54) DATA DE-DUPLICATION IN SERVICE ORIENTED ARCHITECTURE AND WEB SERVICES ENVIRONMENT

(75) Inventors: Chuan Liu, Changsha (CN); Hang Xiao, Beijing (CN); Ming Yan, Beijing (CN); Jean X. Yu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 112 days.

(21) Appl. No.: 13/537,917

(22) Filed: Jun. 29, 2012

(65) Prior Publication Data

US 2014/0006498 A1    Jan. 2, 2014

(51) Int. Cl.
    *G06F 15/16*     (2006.01)
(52) U.S. Cl.
    CPC ....................................... *G06F 15/16* (2013.01)
    USPC .......................................... 709/204; 709/224
(58) Field of Classification Search
    CPC .... G06F 9/546; G06F 11/0793; H04W 28/04; H04W 4/12; H04L 67/104; H04L 69/329; H04L 12/2803; H04L 12/5875; H04L 12/585; H04L 51/12; H04L 12/189; G06Q 20/401; G06Q 40/04
    USPC .................. 709/204, 224, 206; 719/313, 314
See application file for complete search history.

(56) References Cited

U.S. PATENT DOCUMENTS

| 7,685,288 | B2* | 3/2010 | Kakivaya et al. | 709/227 |
|---|---|---|---|---|
| 2003/0055903 | A1* | 3/2003 | Freed | 709/206 |
| 2005/0190912 | A1* | 9/2005 | Hopkins et al. | 380/44 |
| 2005/0216815 | A1* | 9/2005 | Novotny et al. | 714/758 |
| 2006/0010195 | A1 | 1/2006 | Mamou et al. | |
| 2006/0047855 | A1* | 3/2006 | Gurevich et al. | 709/247 |
| 2006/0074848 | A1* | 4/2006 | Lee et al. | 707/1 |
| 2006/0155674 | A1* | 7/2006 | Traut et al. | 707/2 |
| 2006/0200829 | A1* | 9/2006 | Astl et al. | 719/314 |
| 2009/0234795 | A1 | 9/2009 | Haas et al. | |
| 2010/0205660 | A1* | 8/2010 | Griffin | 726/6 |
| 2010/0306176 | A1 | 12/2010 | Johnson et al. | |
| 2011/0022718 | A1 | 1/2011 | Evans et al. | |
| 2011/0113013 | A1* | 5/2011 | Reddy et al. | 707/646 |
| 2011/0138154 | A1 | 6/2011 | Tevis et al. | |

\* cited by examiner

*Primary Examiner* — Kostas Katsikis
(74) *Attorney, Agent, or Firm* — Stephen R. Tkacs; Stephen J. Wolder, Jr.; Thomas E. Tyson

(57) ABSTRACT

A mechanism is provided in a data processing system for de-duplication in a Web services environment. Responsive to receiving a signature for a portion of a request message from a client, the mechanism performs a query in a bit stream repository to determine whether the portion of the request message has been previously received. Responsive to determining the portion of the message has been previously received, the mechanism retrieves the portion of the message from the bit stream repository. The mechanism notifies the client that the portion of the message has been previously received such that the client does not send the portion of the message.

23 Claims, 9 Drawing Sheets

FIG. 4A

```
<soap-env:Envelope xmlns:soap-env="http://schemas.xmlsoap.org/soap/envelope/">
  <soap-env:Header/>
  <soap-env:Body>
    <treatment:GetTreatmentAuditApproval xmlns:treatment="http://[namespaceaddress]">
      <treatment:Patient id="34-234-xxxx-34">
            <treatment:name> Tom </treatment:name>
            <treatment:birthday> 1946-10-10 </treatment:birthday>
            <treatment:CheckInDatetime> 2010-03-08 08:10 </treatment:CheckInDatetime>
            <treatment:CheckOutDatetime> 2010-12-12 12:10 </treatment:CheckOutDatetime>
            <treatment:category>xxxxx</treatment:category>
            <treatment:description> xxxxxxxxx </treatment:description>
      </treatment:Patient>
    <!-- Text information -->
    <treatment:MedicineHistory YearMonth="201003">
            <treatment:treatmentDatetime> 2010-03-08 08:20 am </treatment:treatmentDatetime>
            <treatment:medicament> xxxxx </treatment:medicament>
            <treatment:price> xxxxx </treatment:price>
            <treatment:count> xxxxx </treatment:count>
            <treatment:total> xxxxx </treatment:total>
            <treatment:memo> xxxxx </treatment:memo>

<treatment:treatmentDatetime> 2010-03-08 10:50 am </treatment:treatmentDatetime>
            ...
    <treatment:MedicineHistory YearMonth="201010">
            ...
    <treatment:MedicineHistory YearMonth="201012">
            ...
        </treatment:MedicineHistory>

<!-- Encode picture image information -->
        <treatment:OperationHistory>
          <treatment:CTRecord>
            <treatment:CTDatetime> 2010-03-08 10:30 am </treatment:CTDatetime>
            <treatment:CTOperator> Berty </treatment:CTOperator>
            <treatment:CTOperatorLCN> XXXXXXX</treatment:CTOperatorLCN>
            <treatment:CTPicture EnCode=BASE64 xsi:type="xsd:string" PictureID="1" >

......
            </treatment:CTPicture>
               ......
            <treatment:CTPicture EnCode=BASE64 xsi:type="xsd:string" PictureID="2">

......
            </treatment:CTPicture>
          </treatment:CTRecord>
        </treatment:OperationHistory>
      </treatment:GetTreatmentAuditApproval>
  </soap-env:Body>
</soap-env:Envelope>
```

FIG. 4B

```
<soap-env:Envelope xmlns:soap-env="http://schemas.xmlsoap.org/soap/envelope/">
  <soap-env:Header/>
  <soap-env:Body>
    <treatment:TreatmentAuditApprovalResponse xmlns:treatment="
http://[namespaceaddress]">
      <treatment:AuditorResult >
        <treatment:AuditorName > xxxxx </treatment:AuditorName >
        <treatment:AuditorLCN > xxxxx </treatment:AuditorLCN>
        <treatment:Approved > Yes </treatment:Approved>
        <treatment:comment> xxxxx </treatment:comment>
      </treatment:AuditorResult >
      ......
    </treatment:TreatmentAuditApprovalResponse>
  </soap-env:Body>
</soap-env:Envelope>
```

FIG. 6

| NAMESPACE | TAG NAME | DIG SIG ALGORITHM |
|---|---|---|
| Http://[namespaceaddress] | MedicineHistory\YearMonth | CRC32, MD5 |
| Http://[namespaceaddress] | OperationHistory\CTPicture | Chunk, MD5 |

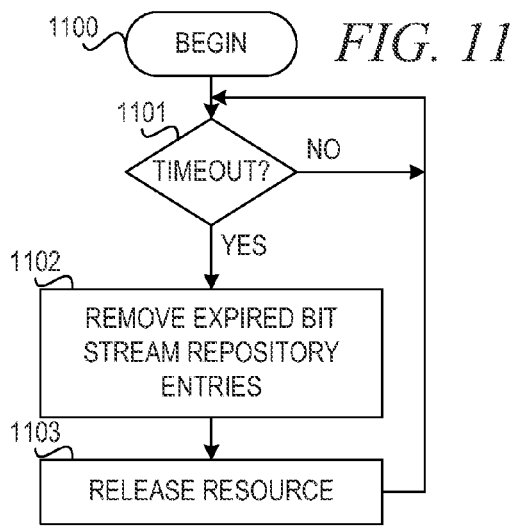

```
<soap-env:Envelope xmlns:soap-env="http://schemas.xmlsoap.org/soap/envelope/">
  <soap-env:Header/>
  <soap-env:Body>
    <treatment:GetTreatmentAuditApproval xmlns:treatment="http://[namespaceaddress]">
      <treatment:Patient id="34-234-xxxx-34">
         ......
      </treatment:Patient>
      <!-- Text information -->
      <treatment:MedicineHistory YearMonth="201003" dedup="Yes" algorithm="CRC32,MD5" signatureCRC="Axxxxx" signatureMD5="Bxxxxx">
         ...
      <treatment:MedicineHistory YearMonth="201010" dedup="Yes" algorithm =" MD5" signatureMD5="Cxxxxx" >
         ...
      </treatment:MedicineHistory>

<!-- Encode picture image information -->
      <treatment:OperationHistory>
         <treatment:CTRecord>
            <treatment:CTDatetime> 2010-03-08 10:30 am </treatment:CTDatetime>
            <treatment:CTOperator> Berty </treatment:CTOperator>
            <treatment:CTOperatorLCN> XXXXXXX</treatment:CTOperatorLCN>
            <treatment:CTPicture EnCode=BASE64 xsi:type="xsd:string" dedup="Yes" algorithm="Chunk, MD5" Chunksize="16K", signature="Hxxxxx, Ixxxxx, Jxxxxx, ..., ...., ..." >
               ......
            </treatment:CTPicture>
               ......
         </treatment:CTRecord>
      </treatment:OperationHistory>
    </treatment:GetTreatmentAuditApproval>
  </soap-env:Body>
</soap-env:Envelope>
```

FIG. 8

| DATA SESSION ID | SIGNATURE | DEDUP ALGORITHM | TAG NAME SPACE | TAG NAME | BIT STREAM |
|---|---|---|---|---|---|
| 0x0001 | AXXXXX BXXXXX | CRC32, MD5 | Http://[namespaceaddress] | MedicineHistory\YearMonth | <tre... |
| 0x0001 | CXXXXX | MD5 | Http://[namespaceaddress] | MedicineHistory\YearMonth | <tre... |
| 0x0001 | HXXXXX | MD5 | Http://[namespaceaddress] | MedicineHistory\CTPicture | <tre... |
| 0x0001 | IXXXXX | MD5 | Http://[namespaceaddress] | MedicineHistory\CTPicture | |
| 0x0001 | JXXXXX | ... | ... | ... | |
| 0x0001 | ... | ... | ... | ... | ... |

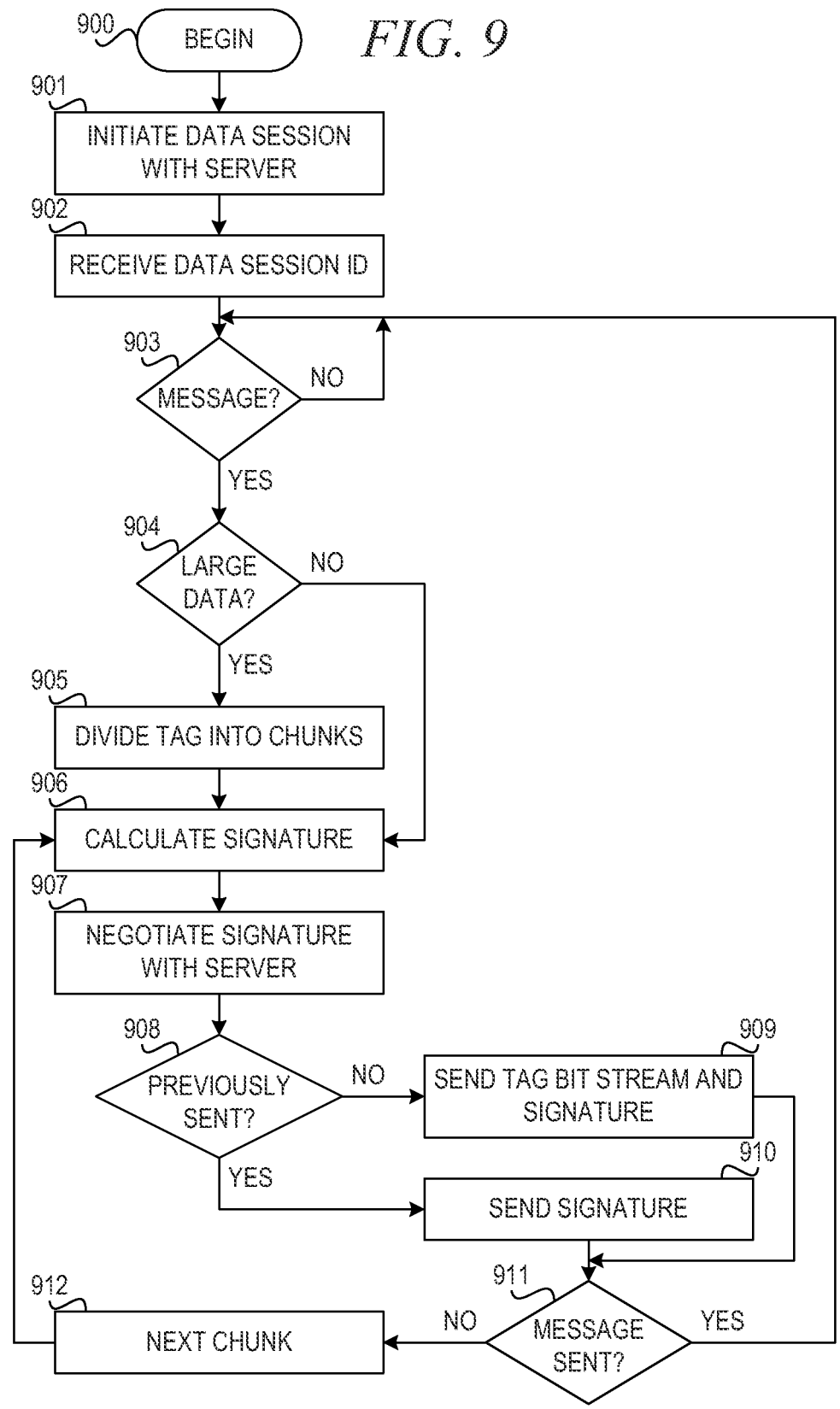

DATA DE-DUPLICATION IN SERVICE ORIENTED ARCHITECTURE AND WEB SERVICES ENVIRONMENT

BACKGROUND

The present application relates generally to an improved data processing apparatus and method and more specifically to mechanisms for data de-duplication in a service oriented architecture and Web services environment.

Service Oriented Architecture (SOA) is a set of principles and methodologies for designing and developing software in the form of interoperable services. These services are well-defined business functionalities that are built as software components that can be reused for different purposes. SOA design principles are used during the phases of systems development and integration.

SOA generally provides a way for consumers of services, such as web-based applications, to be aware of available SOA-based services. For example, several disparate departments within a company may develop and deploy SOA services in different implementation languages; their respective clients will benefit from a well-defined interface to access them. Extensible markup language (XML) is often used for interfacing with SOA services, though this is not required. SOA defines how to integrate widely disparate applications for a Web-based environment and uses multiple implementation platforms. Rather than defining an application programming interface (API), SOA defines the interface in terms of protocols and functionality. An endpoint is the entry point for such a SOA implementation.

Service-orientation requires loose coupling of services with operating systems and other technologies that underlie applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

Simple Object Access Protocol (SOAP) is a protocol specification for exchanging structured information in the implementation of Web services in computer networks. SOAP relies on XML for its message format, and usually relies on other application layer protocols, most notably Hypertext Transfer Protocol (HTTP) and Simple Mail Transfer Protocol (SMTP), for message negotiation and transmission.

A Web service is a method of communication between two electronic devices over the Internet. A Web service is a software system designed to support interoperable machine-to-machine interaction over a network. A Web service has an interface described in a machine readable format, such as Web Services Description Language (WSDL). Other systems interact with the Web service in a manner prescribed by its description using SOAP messages, typically conveyed using HTTP with an XML serialization in conjunction with other Web-related standards.

SUMMARY

In one illustrative embodiment, a method, in a data processing system, is provided for de-duplication in a Web services environment. The method comprises responsive to receiving a signature for a portion of a request message from a client, performing a query in a bit stream repository to determine whether the portion of the request message has been previously received. The method further comprises responsive to determining the portion of the message has been previously received, retrieving the portion of the message from the bit stream repository. The method further comprises notifying the client that the portion of the message has been previously received such that the client does not send the portion of the message.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B are example request and response messages in accordance with an example embodiment;

FIG. 6 depicts an example de-duplication policy in accordance with an illustrative embodiment;

FIG. 7 depicts an example request message with signature calculated in accordance with an illustrative embodiment;

FIG. 8 depicts an example bit stream repository in accordance with an illustrative embodiment;

FIG. 9 is a flowchart illustrating operation of a client Web service handler in accordance with an illustrative embodiment;

FIG. 11 is a flowchart illustrating operation of a bit stream repository manager in accordance with an illustrative embodiment.

DETAILED DESCRIPTION

The illustrative embodiments provide a mechanism for message de-duplication in Service Oriented Architecture and Web services environment. A message de-duplication handler in a client calculates digital signatures for message bit streams. The client Web service handler may calculate digital signatures according to a pre-defined de-duplication policy. The client Web service handler adds the signature to the tag bit stream attributes as a unique identifier of the tag bit stream. For large data, the client Web service handler may divide the large data into fixed or variable length chunks and calculate a digital signature for each chunk. The client Web service handler negotiates the signature with the server to determine whether the chunk has been previously transmitted. If the chunk has not been previously transmitted, the client Web service hander sends the tag bit stream directly. If the chunk has been previously transmitted, the client Web service handler ignores the tag bit stream and sends only the signature.

The illustrative embodiments provide a server Web service handler allocates a data session identifier (ID) to identify a de-duplication session and returns the data session ID to the client. For each message or chunk, the server Web service handler negotiates the signature with the client to determine whether a tag bit stream for a given signature has already been received and stored in a tag bit stream repository. If the signature is not found in the tag bit stream repository, the server Web service handler notifies the client, which then sends the tag bit stream. If the signature is found in the tag bit stream, the server Web service handler retrieves the tag bit stream from the tag bit stream repository and composes the message.

Figure 1:
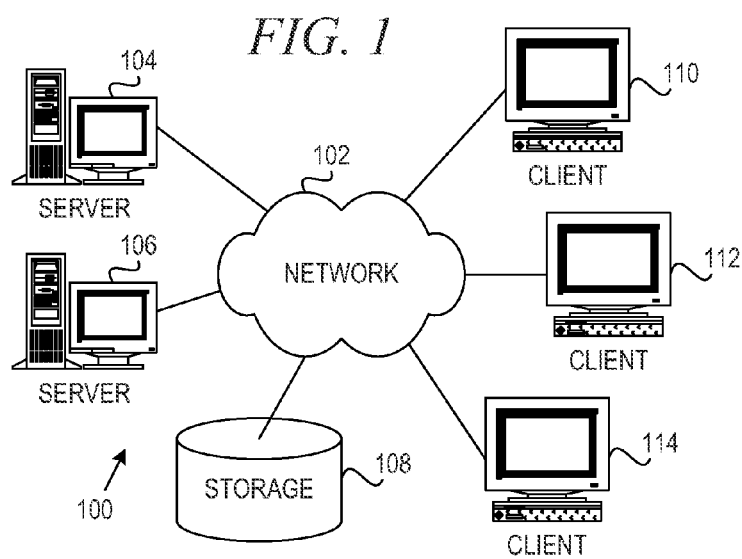
FIG. 1 depicts a pictorial representation of an example distributed data processing system in which aspects of the illustrative embodiments may be implemented.
Figure 2:
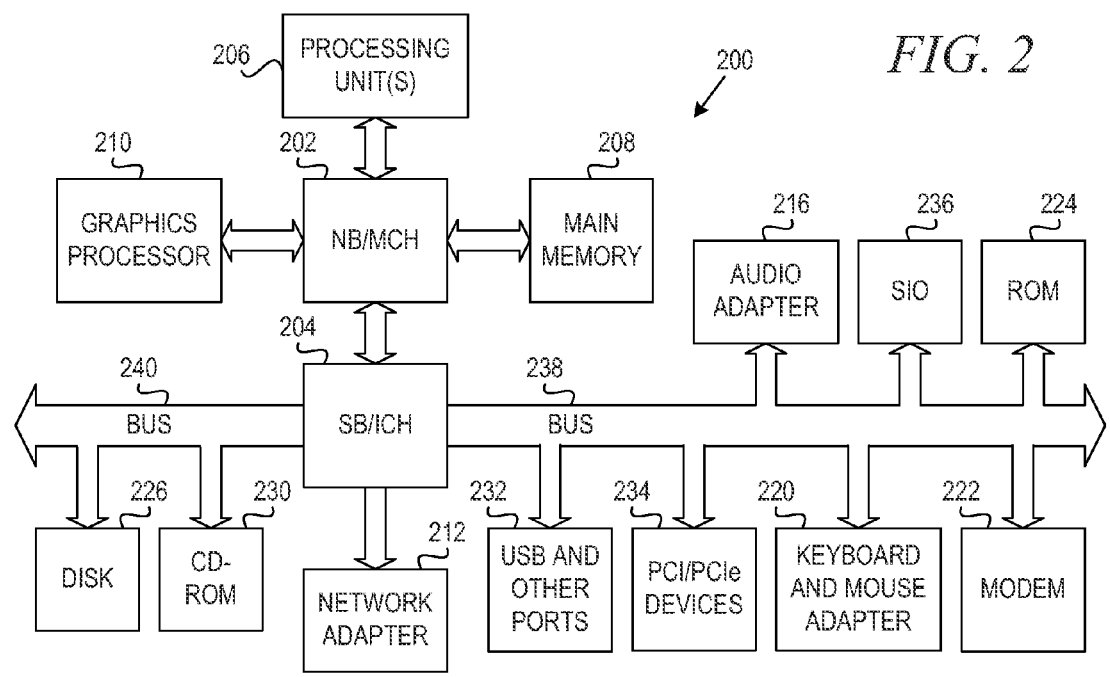
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
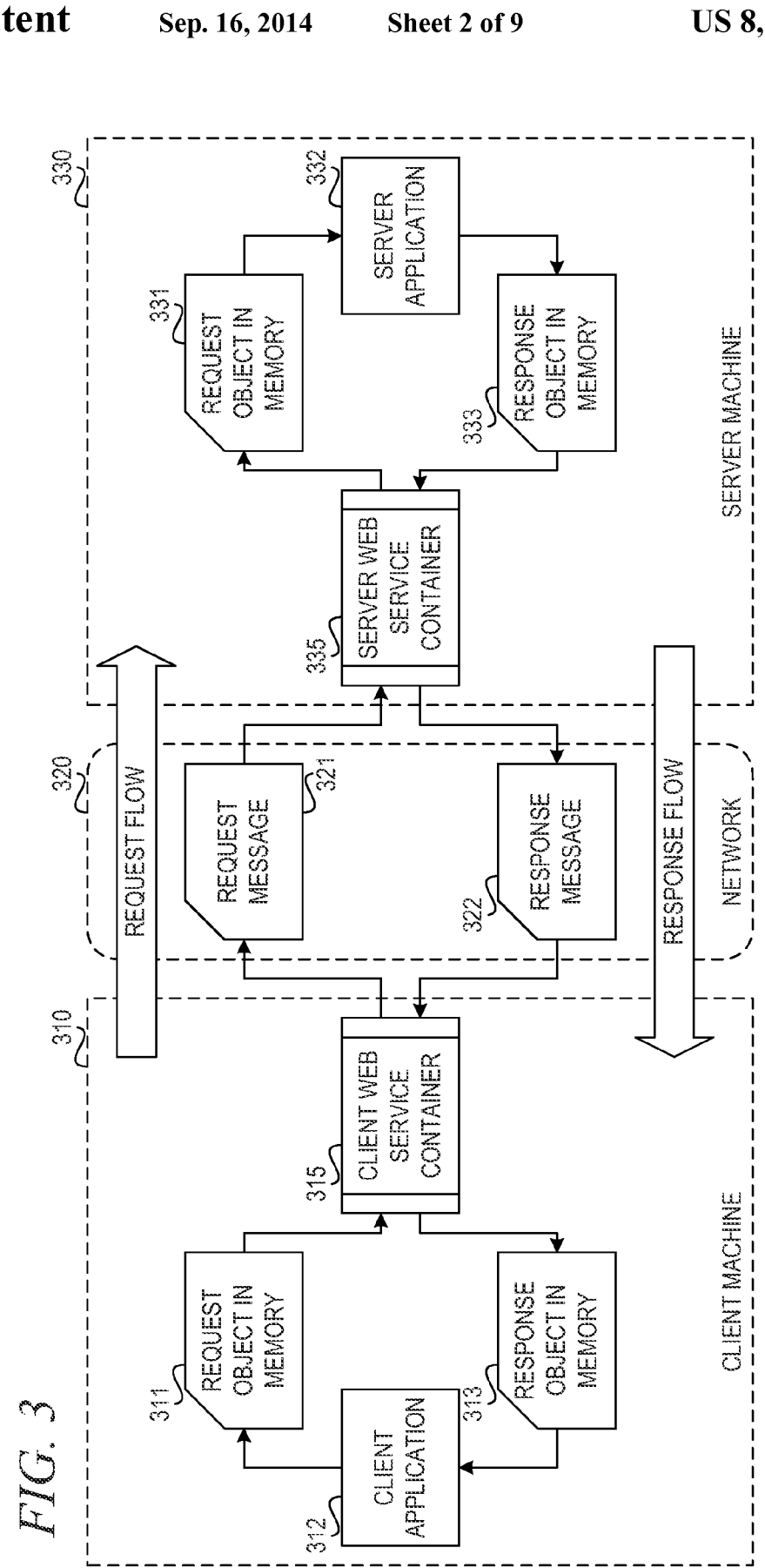
FIG. 3 depicts a pictorial representation of an example Web services environment in which aspects of the illustrative embodiments may be implemented.

FIG. 3 depicts a pictorial representation of an example Web services environment in which aspects of the illustrative embodiments may be implemented. Web services are widely used in Service Oriented Architecture (SOA) systems to integrate business processes and information technology (IT) systems across enterprises. Because of the stateless nature of Web services, each Simple Object Access Protocol (SOAP) request is treated as independent transaction that is unrelated to any previous request. The service does not keep track of any previous data received during previous requests. In the case of an error condition, the client must resend everything.

Client machine 310 comprises client application 312, which creates business logic data into request object 311 in its memory space and invokes the client Web service container 315 to generate a request message 321, which may be a SOAP request message in XML. Client Web service container 315 sends request message 321 through network 320 to server Web service container 335 in server machine 330. Server Web service container 335 picks up request message 321 from network 320 and decomposes request message 321 into request object 331 in the memory address space of server application 332.

In the reverse sequence, server application 332 generates a response object 333 in memory. Server Web service container 335 generates response message 322 from response object 333 and sends response message 322 to network 320. Client Web service container 315 receives response message 322 form network 320 and decomposes response message 322 into response object 313 in the memory address space of client application 312.

In business systems, the original request message 321 is created and collected from different business units by different people. Server application 332 may detect an error in request message 321, which is in violation of server side business constraint rules. In this kind of error condition, because the Web service is a simple request/response behavior, the SOAP message will be discarded and some error response message is returned to client application 312 to notify of transaction failure. After some corrective actions, client application 312 may repackage another request message.

In hospital and insurance company communication, for example, a treatment audit approval request message may contain computed tomography (CT) images or magnetic resonance imaging (MRI) images for reviewing, auditing, and archiving. The client application creates large request messages and transfers the messages to servers belonging to hospitals and insurance companies.

FIGS. 4A and 4B are example request and response messages in accordance with an example embodiment. The re-transferring of entire SOAP messages often costs a large amount of system and network resources. Re-transfer of SOAP messages often causes long waiting time on the client side and blocks client side business.

In accordance with an illustrative embodiment, a mechanism is provided to reduce data transfer between the client and the Web service provider. The client Web service container and server Web service container implement de-duplication to reduce data stream transfer. The mechanism creates a new function in the Web service containers to reduce data transfer based on XML schema. The mechanism defines container-wide data de-duplication policy. The mechanism allows dynamic modification of de-duplication policy per-message with a new de-duplication property in the XML tag. The mechanism creates and inserts de-duplication functionality using Web service handlers.

Figure 5:
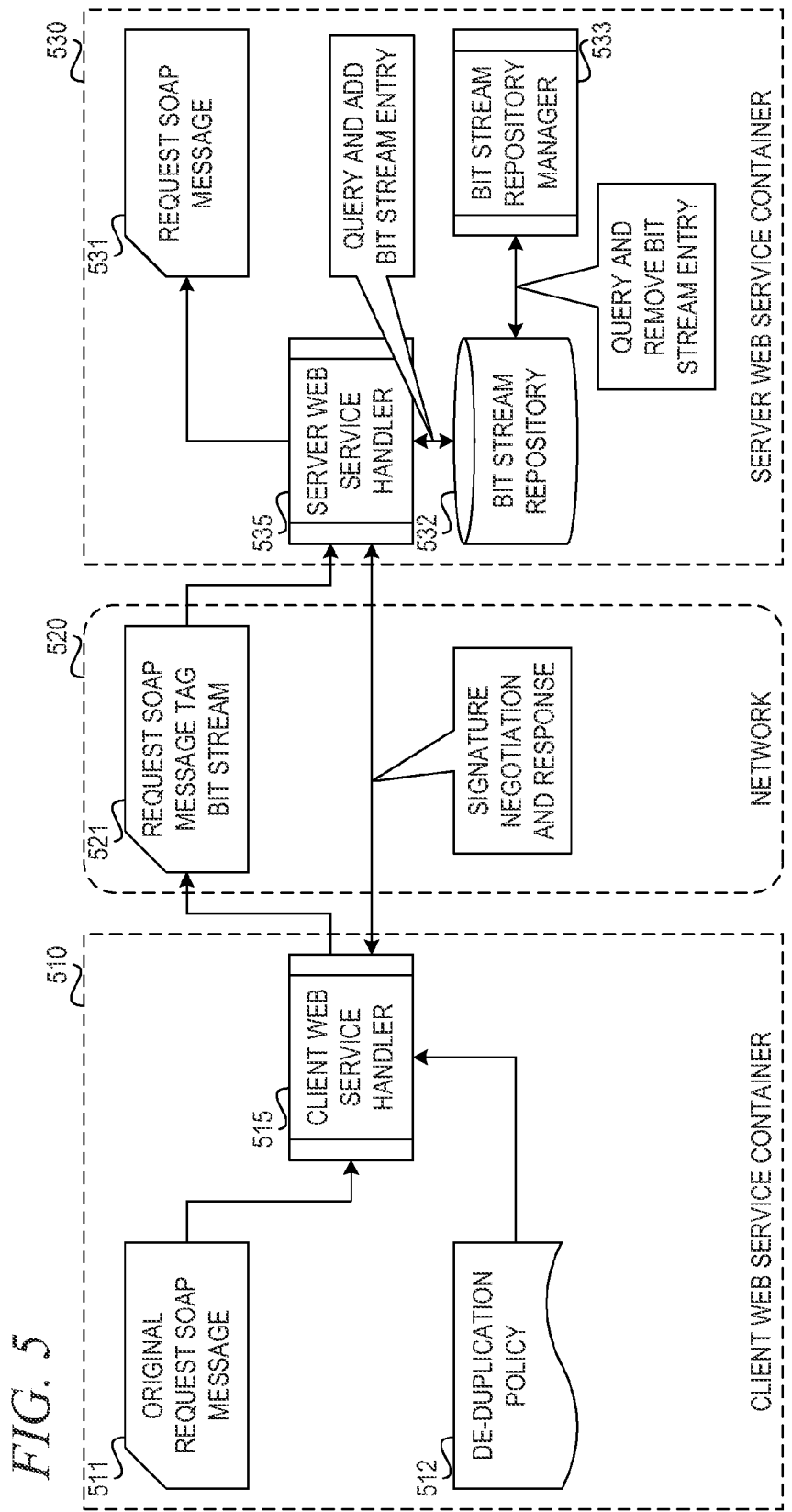
FIG. 5 depicts a pictorial representation of a Web services environment with data de-duplication in accordance with an illustrative embodiment.

FIG. 5 depicts a pictorial representation of a Web services environment with data de-duplication in accordance with an illustrative embodiment. Client Web service container 510 receives an original request SOAP message 511 generated by the client application and generates request message tag bit stream 521. Client Web service container 510 transfers the request message tag bit stream 521 through network 520. Server Web service container 530 receives request message tag bit stream 521 and generates request SOAP message 531 for the server application. Client Web service container 510 may be client Web service container 315 of FIG. 3, for example, and server Web service container 530 may be server Web service container 335 of FIG. 3, for example.

Client Web service container 510 comprises client Web service handler 515, which receives original request SOAP message 511. Client Web service handler 515 calculates a digital signature for the XML tag bit stream of request message 511. Client Web service handler 515 may use a pre-defined digital signature algorithm defined in a de-duplication policy 512. Client Web service handler may add the signature to the request SOAP message tag bit stream as an XML tag attribute uniquely identifying the tag bit stream.

For a request message that contains large data, such as a picture or the like, client Web service handler 515 may divide the tag bit stream into fixed or variable length chunks and calculate a signature for each chunk. Client Web service handler 515 may use a specified chunk algorithm defined in de-duplication policy 512.

For a tag not defined in the de-duplication policy 512, client Web service handler 515 sends the request SOAP message tag bit stream 521 to server Web service handler 535.

Client Web service handler 515 receives a data session identifier (ID) from server Web service handler 535. The data session ID identifies the session of de-duplication service and server Web service handler 535 uses the data session ID to narrow the query for de-duplication. Client Web service handler 515 calculates a signature for each tag bit stream or chunk. Signature algorithms, such as hash functions, have the potential to result in collisions where multiple input data can have the same resulting signature. To avoid potential collisions, Client Web service handler 515 may use multiple signature algorithms for the same chunk or tag bit stream.

Client Web service handler 515 negotiates the signature with server Web service handler 535, which queries bit stream repository 532 for the signature. Server Web service handler 535 uses the data session ID to narrow the query of bit stream repository 532. If server Web service handler 535 does not find the signature in bit stream repository 532, server Web service handler 535 notifies client Web service handler 515, which sends request SOAP message tag bit stream 521. Server Web service handler 535 stores the tag bit stream and the signature in bit stream repository.

If server Web service handler 535 finds the signature in bit stream repository 532, server Web service handler 535 notifies client Web service handler 515, which does not send the tag bit stream 521. Server Web service handler 535 composes request SOAP message 530 from tag bit streams received from client Web service handler 515 and/or retrieved from bit stream repository 532.

Bit stream repository manager 533 performs garbage collection of bit stream repository 532. When server Web service handler 535 stores de-duplication entries in bit stream repository 532, server Web service handler 535 stores an expiration date in association with the bit stream and signature. Bit stream repository manager 533 periodically queries bit stream repository 532 to identify entries that have expired. Bit stream repository manager 533 removes entries that have expired and releases the resource. Bit stream repository manager 533 may also remove entries when server Web service handler 535 confirmed that entries are completed and no longer needed. For example, server Web service handler 535 may notify bit stream repository manager 533 when a de-duplication session terminates, and bit stream repository manager 533 removes de-duplication entries associated for the de-duplication session.

FIG. 6 depicts an example de-duplication policy in accordance with an illustrative embodiment. In the depicted example, the de-duplication policy includes the namespace and the digital signature algorithms to be used to calculate signatures.

The client Web service handler calculates digital signatures for XML tags in the request SOAP message tag bit stream based on the defined de-duplication policy. FIG. 7 depicts an example request message with signature calculated in accordance with an illustrative embodiment. The application may specify the digital signature algorithm for specific tags, in which case the de-duplication policy may be ignored.

The original request message may also contain de-duplication policy information, which is generated by the client application. When the client Web service handler finds a tag that has attributes with de-duplication and algorithm set, the client Web service handler uses the appropriate de-duplication process for the tag bit stream. Thus, the application has an option to manipulate the de-duplication behavior of the Web service handlers.

The server Web service handler picks up the request message and stores the signature and corresponding bit stream in the bit stream repository. Meanwhile, the message is posted to other handlers in the server Web service container and final target to the server side application. The repository includes the tag name, tag name space, bit stream content, signature, de-duplication algorithm, and data session information to separate the different sessions in the Web service container. FIG. 8 depicts an example bit stream repository in accordance with an illustrative embodiment.

The server side application begins the business processing on the request message. If no business errors occur and the business processing completes successfully, the server application returns a response message to the client side application. If an error does occur, the client application receives an error response message and runs the same business logic application again. The client application then repackages the request message, and the client Web service handler negotiates de-duplication with the server Web service handler.

The client Web service handler recalculates the digital signatures based on the same de-duplication policy. Before sending a tag bit stream to the server, the client Web service handler negotiates with the server Web service handler to determine whether the signature exists in the server-side bit stream repository. If the value is new to the bit stream repository, the client Web service handler sends the tag bit stream again. Otherwise, the client Web service handler sends only the signature, because the signature identifies the bit stream content uniquely.

The server Web service handler combines the bit stream from the client Web service handler and the bit stream retrieved from the bit stream repository by signature. The server Web service handler then composes the request message from the received and retrieved bit stream content and posts the request message to the server application for business processing.

If a particular request message experiences a predetermined number of logic errors at the server side, perhaps due to signature collisions, the client application may limit the number of times a request message can be transmitted with de-duplication enabled.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 9 is a flowchart illustrating operation of a client Web service handler in accordance with an illustrative embodiment. Operation begins (block 900), and the client Web service handler initiates a data session with the server (block 901). The client Web service handler then receives a data session identifier (ID) (block 902). Then, the client Web service handler determines whether a request message is received for transfer from a client application (block 903). If a message is not received from the client application, operation returns to block 903 until a message is received for transfer.

If a message is received from the client application for transfer to the server in the data session in block 902, the client Web service handler determines whether the request message contains large data (block 904). If the request message contains large data, the client Web service handler divides the request message bit stream into chunks (block 905) and calculates a signature for the first chunk (block 906). If the request message does not contain large data in block 904, the client Web service handler calculates a signature for the request message bit stream (block 906).

Thereafter, the client Web service handler negotiates the signature (block 907) with the server Web service handler, which notifies the client Web service handler whether the tag bit stream was previously sent (block 908). If the tag bit stream was not previously sent, the client Web service handler sends the tag bit stream and signature (block 909). If the tag bit stream was previously sent in block 908, the client Web service handler sends the signature (block 910).

Then, the client Web service handler determines whether the entire request message has been sent (block 911). If the entire request message has not been sent, the client Web service handler considers the next chunk (block 912), and operation returns to block 906 to calculate the signature for the next chunk. If the entire request message has been sent in block 911, operation returns to block 903 to determine whether a request message is received for transfer from a client application.

Figure 10:
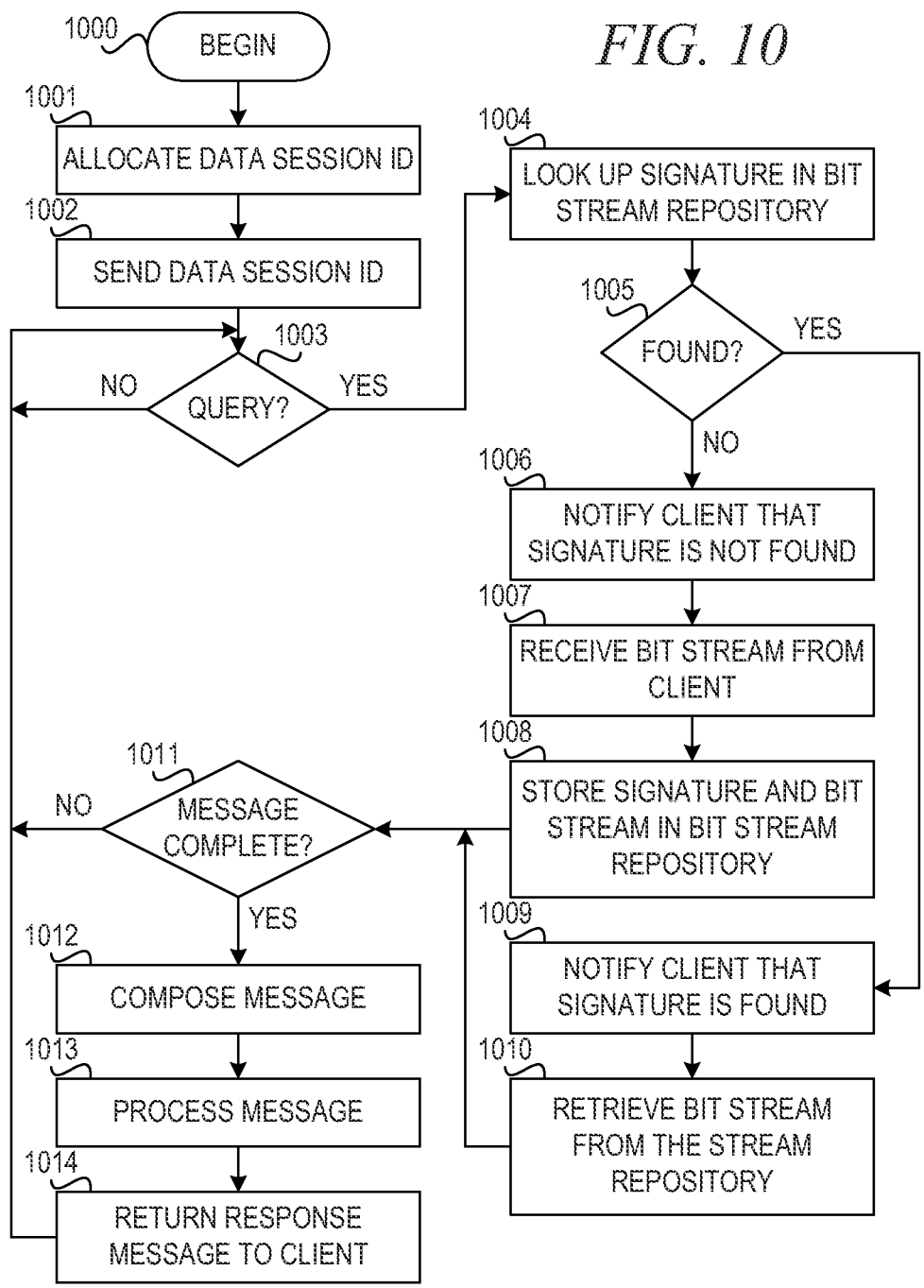
FIG. 10 is a flowchart illustrating operation of a server Web service handler in accordance with an illustrative embodiment.

FIG. 10 is a flowchart illustrating operation of a server Web service handler in accordance with an illustrative embodiment. Operation begins (block 1000), and the server Web service handler allocates a data session identifier (ID) (block 1001) and sends the data session ID to the client Web service handler (block 1002). The server Web service handler determines whether a query is received from the client Web service handler to negotiate a signature (block 1003). If the server Web service handler does not receive a query, operation returns to block 1003 until a query is received.

If a query is received in block 1003, the server Web service handler looks up the signature in a bit stream repository (block 1004). The server Web service handler determines whether the signature is found in the bit stream repository (block 1005). If the signature is not found, the server Web service handler notifies the client that the signature is not found (block 1006). The server Web service handler then receives the tag bit stream for a request message from the client (block 1007) and stores the signature and the tag bit stream in the bit stream repository (block 1008).

If the signature is found in the bit stream repository in block 1005, the server Web service handler notifies the client that the signature is found (block 1009) and retrieves the tag bit stream from the bit stream repository (block 1010).

Thereafter, the server Web service handler determines whether the request message is completely transferred (block 1011). If the message is not completely transferred, operation returns to block 1003 to determine whether a query is received from the client Web service handler.

If the message is completely transferred in block 1011, the server Web service handler composes the request message (block 1012) and passes it to the server application. The server application processes the request message to generate a response message (block 1013) and returns the response message to the client (block 1014). Thereafter, operation returns to block 1003 to determine whether a query is received from the client Web service handler.

FIG. 11 is a flowchart illustrating operation of a bit stream repository manager in accordance with an illustrative embodiment. Operation begins (block 1100), and the bit stream repository manager determines whether a timeout condition exists (block 1101). If a timeout condition does not exist, operation returns to block 1101 until a timeout condition exists. If a timeout condition does exist in block 1101, the bit stream repository manager removes expired bit stream repository entries (block 1102) and releases the resources (block 1103). Thereafter, operation returns to block 1101 until a timeout condition exists.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for message de-duplication in Service Oriented Architecture and Web services environment. A message de-duplication handler in a client calculates digital signatures for message bit streams. For large data, the client Web service handler may divide the large data into fixed or variable length chunks and calculate a digital signature for each chunk. The client Web service handler negotiates the signature with the server to determine whether the chunk has been previously transmitted. If the chunk has not been previously transmitted, the client Web service hander sends the tag bit stream directly. If the chunk has been previously transmitted, the client Web service handler ignores the tag bit stream and sends only the signature.

The illustrative embodiments provide a server Web service handler allocates a data session identifier (ID) to identify a de-duplication session and returns the data session ID to the client. For each message or chunk, the server Web service handler negotiates the signature with the client to determine whether a tag bit stream for a given signature has already been received and stored in a tag bit stream repository. If the signature is not found in the tag bit stream repository, the server Web service handler notifies the client, which then sends the tag bit stream. If the signature is found in the tag bit stream, the server Web service handler retrieves the tag bit stream from the tag bit stream repository and composes the message.

The embodiments may also be applied to the client Web service handler such that the client Web service handler and the server Web service handler perform de-duplication for response messages from the server to the client. A message de-duplication handler in a server may calculate digital signatures for response message bit streams. The server Web service handler may negotiate the signature with the client to determine whether a message or chunk has been previously transmitted. If the chunk has not been previously transmitted, the server Web service hander may send the tag bit stream directly. If the chunk has been previously transmitted, the server Web service handler may ignore the tag bit stream and send only the signature.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for de-duplication in a Web services environment, the method comprising:
    responsive to receiving a signature for a portion of a request message from a client at a server machine, performing a query in a bit stream repository to determine whether the portion of the request message has been previously received;

responsive to determining the portion of the request message has been previously received, retrieving the portion of the request message from the bit stream repository;

notifying the client that the portion of the request message has been previously received such that the client does not send the portion of the request message; and responsive to determining that receipt of the entire request message is complete, composing the request message, using the portion of the request message and at least one other portion of the request message, and according to de-duplication policy information, and passing the request message to a server application, wherein the de-duplication policy information comprises a digital signature algorithm used to calculate the signature for the portion of the request message and a chunk algorithm used to decompose the request message into the portion of the request message and the at least one other portion of the request message.

2. The method of claim 1, further comprising:

responsive to the server Web service handler determining the portion of the request message has not been previously received, notifying the client that the portion of the request message has not been previously received;

receiving the portion of the request message from the client; and stone an entry in the hit stream repository, wherein the entry comprises the signature and the portion of the message.

3. The method of claim 1, further comprising:

receiving a response message generated by the server application; and returning the response message to the client.

4. The method of claim 1, further comprising:

allocating a data session identifier for a de-duplication session, wherein performing a query in a bit stream repository comprises using the data de-duplication session to narrow the query.

5. The method of claim 1, wherein the request message is a simple object access protocol request message.

6. The method of claim 5, wherein the simple object access protocol request message is an extensible markup language message.

7. The method of claim 1, wherein the method is performed by a Web service handler in a Web service container at the server machine.

8. The method of claim 7, wherein a previous message comprises the de-duplication policy information, wherein the Web service handler uses the de-duplication policy information to compose the request message.

9. A computer program product comprising a computer readable storage memory having a computer readable program stored therein, wherein the computer readable program, when executed on a server computing device, causes the computing device to:

responsive to receiving a signature for a portion of a request message from a client, perform a query in a bit stream repository to determine whether the portion of the request message has been previously received;

responsive to determining the portion of the request message has been previously received, retrieve the portion of the request message from the bit stream repository;

notify the client that the portion of the request message has been previously received such that the client does not send the portion of the request message; and responsive to determining that receipt of the entire request message is complete, compose the request message, using the portion of the request message and at least one other portion of the request message and according to de-duplication policy information, and pass the request message to a server application, wherein the de-duplication policy information comprises a digital signature algorithm used to calculate the signature for the portion of the request message and a chunk algorithm used to decompose the request message into the portion of the request message and the at least one other portion of the request message.

10. The computer program product of claim 9, wherein the computer readable program further causes the server computing device to:

receive a response message generated by the server application; and return the response message to the client.

11. The computer program product of claim 9, wherein the computer readable program further causes the server computing device to:

allocate a data session identifier for a de-duplication session, wherein performing a query in a bit stream repository comprises using the data de-duplication session to narrow the query.

12. The computer program product of claim 9, wherein the request message is a simple object access protocol request message.

13. The computer program product of claim 12, wherein the simple object access protocol request message is an extensible markup language message.

14. The computer program product of claim 9, wherein the computer readable program is a Web service handler in a Web service container.

15. The computer program product of claim 14, wherein a previous message comprises the de-duplication policy information, wherein the Web service handler uses the de-duplication policy information to compose the request message.

16. The computer program product of claim 9, wherein the computer readable program further causes the server computing device to:

responsive to determining the portion of the request message has not been previously received, notify the client that the portion of the request message has not been previously received;

receive the portion of the request message from the client; and store an entry in the bit stream repository, wherein the entry comprises the signature and the portion of the request message.

17. An apparatus, comprising:

a processor; and a memory coupled to the processor, wherein the memory comprises instructions which, when executed by the processor, cause the processor to:

responsive to receiving a signature for a portion of a request message from a client at a server machine, perform a query in a bit stream repository to determine whether the portion of the request message has been previously received;

responsive to determining the portion of the request message has been previously received, retrieve the portion of the request message from the bit stream repository;

notify the client that the portion of the request message has been previously received such that the client does not send the portion of the request message; and responsive to determining that receipt of the entire request message is complete, compose the request message, using the portion of the request message and at least one other portion of the request message, and according to de-duplication policy information, and pass the request message to a server application, wherein the de-duplication policy information comprises a digital signature algorithm used to calculate the signature for the portion of the request message and a chunk algorithm used to decompose the request message into the portion of the request message and the at least one other portion of the request message.

18. The apparatus of claim 17, wherein the instructions cause the processor to:

responsive to determining the portion of the request message has not been previously received, notify the client that the portion of the request message has not been previously received;

receive the portion of the request message from the client; and store an entry in the bit stream repository, wherein the entry comprises the signature and the portion of the request message.

19. The apparatus of claim 17, wherein the instructions further cause the processor to:

receive a response message generated by the server application; and return the response message to the client.

20. The apparatus of claim 17, wherein the instructions further cause the processor to:

allocate a data session identifier for a de-duplication session, wherein performing a query in a bit stream repository comprises using the data de-duplication session to narrow the query.

21. The apparatus of claim 17, wherein the message is a simple object access protocol request message.

22. The apparatus of claim 21, wherein the simple object access protocol request message is an extensible markup language message.

23. The apparatus of claim 17, wherein the instructions comprise a Web service handler in a Web service container and wherein the apparatus comprises the server machine.

\* \* \* \* \*